Figure 1:
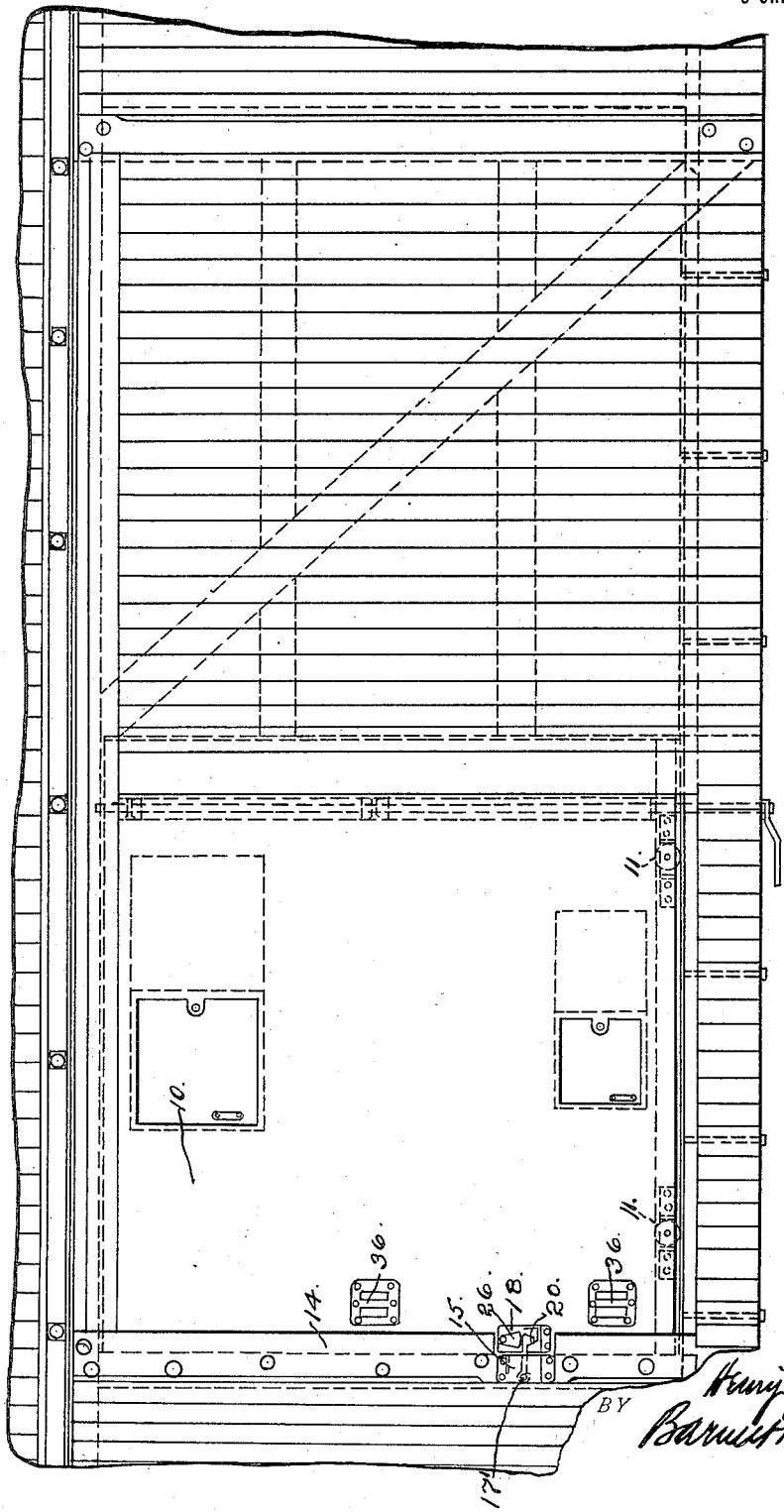

H. J. TIERNEY.
LOCKING DEVICE FOR CAR DOORS.
APPLICATION FILED JULY 23, 1915.

1,182,058.

Patented May 9, 1916.
3 SHEETS—SHEET 1.

INVENTOR.
Henry J. Tierney
BY
Barnett Numan
ATTORNEYS

H. J. TIERNEY.
LOCKING DEVICE FOR CAR DOORS.
APPLICATION FILED JULY 23, 1915.
1,182,058.
Patented May 9, 1916.
3 SHEETS—SHEET 2.
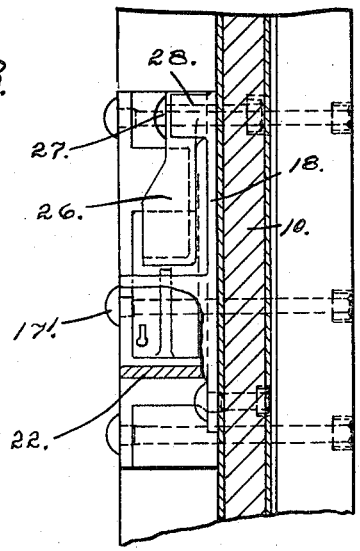
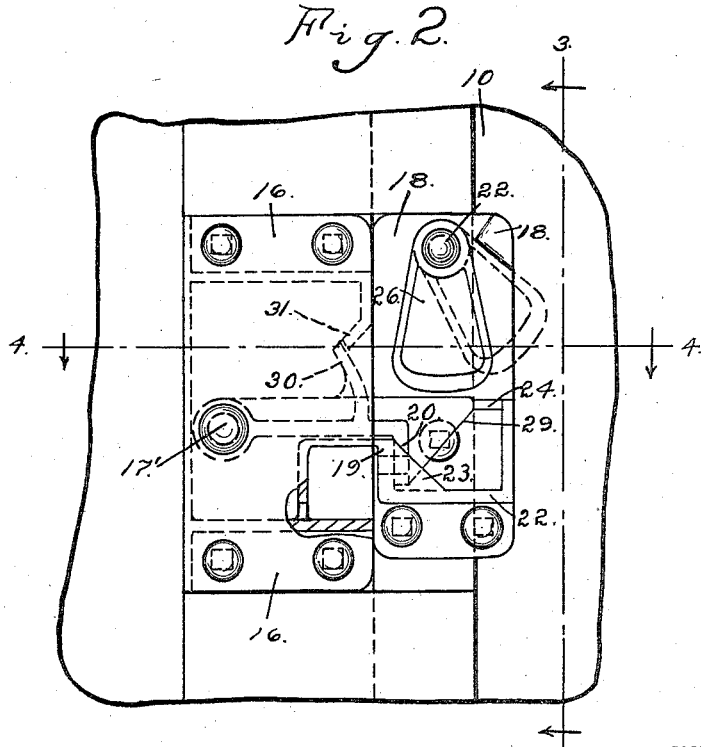
INVENTOR.
Henry J. Tierney
BY Barnett Trueman
ATTORNEYS H. J. TIERNEY.
LOCKING DEVICE FOR CAR DOORS.
APPLICATION FILED JULY 23, 1915.
1,182,058.
Patented May 9, 1916.
3 SHEETS—SHEET 3.
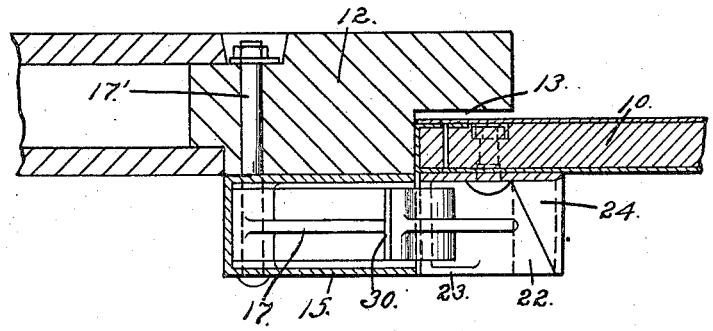
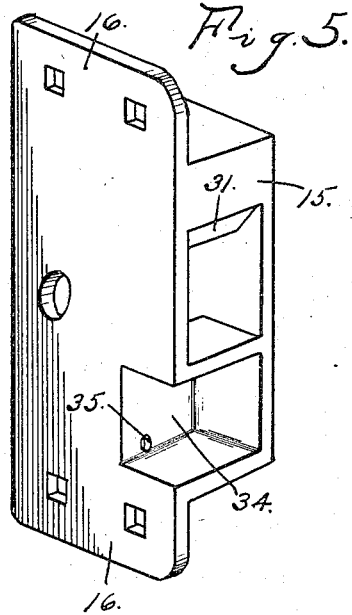
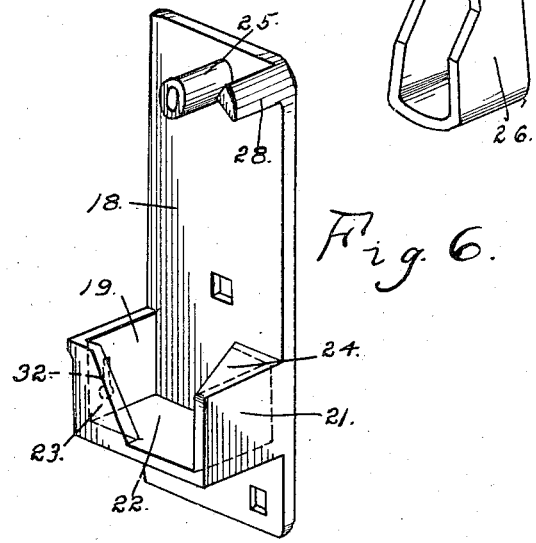
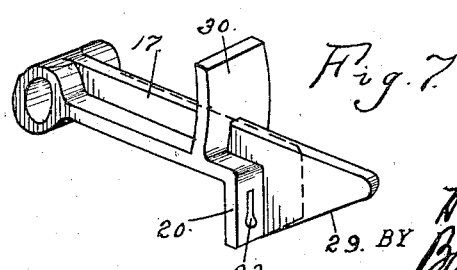

UNITED STATES PATENT OFFICE.

HENRY J. TIERNEY, OF DENISON, TEXAS, ASSIGNOR, BY DIRECT AND MESNE ASSIGNMENTS, OF ONE-THIRD TO SVEN P. ALQUIST, OF SEDALIA, MISSOURI, AND ONE-THIRD TO WILLIAM L. KELLOGG, OF PARSONS, KANSAS.

LOCKING DEVICE FOR CAR-DOORS.

1,182,058.     Specification of Letters Patent.     Patented May 9, 1916.

Application filed July 23, 1915. Serial No. 41,566.

*To all whom it may concern:*

Be it known that I, HENRY J. TIERNEY, a citizen of the United States, residing at Denison, in the county of Grayson and State of Texas, have invented certain new and useful Improvements in Locking Devices for Car-Doors, of which the following is a specification.

My invention relates to a locking device for a sliding door, and the principal object of the invention is to provide a suitable device for locking the forward edge of a sliding freight car door to the door frame which device will effect such locking operation automatically when the door is closed, and which will be simple in its construction, consisting of a few parts that are relatively heavy and strong so that the device will not be easily injured by the rough handling to which everything on a freight car is subjected.

A further object of the invention is to construct a housing for the latch member which will protect the same from being clogged by ice, snow, cinders, and the like.

A further object is to provide a locking device to which the ordinary car seal may be readily and conveniently applied so that the latch cannot be raised and the door opened without detection.

The invention has for further objects such other new and improved constructions, devices and arrangements relating to locking means for sliding doors as will be hereinafter described and claimed.

The invention is illustrated, in a preferred embodiment, in the accompanying drawings which show a freight car door construction of the type disclosed in my pending application Serial No. 41,565, filed July 23, 1915. The locking device of this invention might obviously be used in connection with sliding doors differing in construction from this one.

In the drawings, Figure 1 shows, in elevation, the car door and adjacent portions of the car. Fig. 2 is an enlarged elevation, with parts in section, of the locking device. Figs. 3 and 4 are sectional views taken on lines 3—3 and 4—4 of Fig. 2. Fig. 5 is a view, in perspective, of the latch bar housing. Fig. 6 is a similar view of the element engaged by the latch bar. Fig. 7 is a view of the latch bar, and Fig. 8 is a view of the dog for keeping the latch bar in locking position.

Like characters of reference designate like parts in the several figures of the drawings.

Referring to the drawings, 10 is a sliding box car door which is shown as supported on rollers 11, 11. 12 is the forward door post of the car which is gained out at 13. 14 is a strip bolted to the post 12 which provides with the post 12 a recess for the forward edge of the door. The strip 14 is cut away to receive a housing 15 which is provided with flanges 16 by means of which the housing is fastened to the strip 14. A latch bar 17 is pivotally mounted within the housing 15 on a bolt 17' which extends through the housing and preferably also through the post 12.

Secured to the outer surface of the door 10 at the forward edge thereof is a plate 18 formed with an outstanding web 19 adapted to be engaged by the hooked end 20 of latch bar 17. The plate is also preferably provided with a web 21 forming a protection for the end of the latch bar. The structure above described is strengthened by a horizontal web 22 and diagonal webs 23, 24. The plate 18 is provided with a stud 25 on which is pivoted a dog 26, the dog being held upon the stud by a bolt 27. 28 is a stop adjacent the stud 25. The latch bar is formed at its forward end with a beveled portion 29 adapted to be engaged by the web 19 on the plate 18 when the door is closed. The latch bar is also preferably formed with an upwardly and backwardly curved web 30 and the housing with the inwardly and downwardly projecting flange 31 which comes close to the web 30. By this arrangement the housing containing the latch bar is prevented from being clogged by ice, snow, dirt, cinders and the like. The web 19 is formed with a slot 32 and the latch with a slot 33, these slots registering one with the other so that the latch may be sealed to the web 19 by any suitable seal. In order that this operation may be conveniently performed the housing 15 is formed with a recess 34 which is open at the front as well as at the side adjacent web 19. The closed side of the housing is preferably provided with a water outlet 35.

The device operates as follows: When the door is closed the upper edge of web 19 strikes the beveled surface 29 on the latch 17 and raises the latch so that it comes against the dog 26 moving the same to the dotted line position of Fig. 2. The hooked portion of the latch drops over the web 19 and the dog returns by gravity to its normal position. In this position it prevents the latch bar from being displaced from its locking position. The stop 28 serves to prevent the dog from being thrown out too far. To open the door the dog is turned in the direction toward the stop sufficiently to permit the latch bar to be raised. The door can then be opened, for example, by pulling back on the hand grips 36.

I claim:

1. The combination with a door frame and sliding door, of a locking device comprising a housing secured to one of said structures and closed except on the side adjacent said other structure, a latch bar pivotally mounted within and projecting through the open side of said housing, a plate on the other of said structures formed with an outstanding web with which the latch bar has a locking engagement when the door is closed, a web on the latch bar which closes the open side of the housing and a dog against which the end of the latch bar is thrust when the door is moved to its closed position; the end of the latch bar being formed with a cam adapted to be engaged by said outstanding web by a closing movement of the door.

2. The combination with a door frame and sliding door, of a locking device comprising a housing secured to one of said structures, a latch bar pivotally mounted within and projecting from said housing, a plate on the other of said structures formed with an outstanding web with which said latch bar has a locking engagement when the door is closed, and a dog against which the end of the latch bar is thrust when the door is moved to its closed position; the end of the latch bar being formed with a cam adapted to be engaged by said outstanding web by a closing movement of the door, said latch bar being formed with an upwardly and backwardly curved web and the housing with an internal depending flange which comes down close to the web on said latch bar.

3. The combination with a door frame and sliding door, of a locking device comprising a housing secured to one of said structures, a latch bar pivotally mounted within and projecting from said housing, a plate on the other of said structures formed with an outstanding web with which said latch bar has a locking engagement when the door is closed, and a dog against which the end of the latch bar is thrust when the door is moved to its closed position; the end of the latch bar being formed with a cam adapted to be engaged by said outstanding web by a closing movement of the door, said latch bar and web being formed with registering perforations for a car seal and the housing with a recess opening at the side opposite the perforated portion of said web and at the front.

4. The combination with a door frame and sliding door, of a housing on the door frame, a hook-shaped latch bar pivotally mounted within said housing and formed with a cam at its outer end and with an upwardly and backwardly curved web, a depending flange on the housing which stands close to the curved web on the latch bar, a plate on the door formed with a web with which said latch bar has a locking engagement when the door is in closed position and adjacent thereto with a web to protect the end of the latch bar, a dog pivotally mounted on said plate, and a stop lug on the plate for the dog; said latch bar and the web engaged thereby being formed with registering perforations for a seal and the housing being formed below the latch bar with a recess open at the side toward the door and at the front.

HENRY J. TIERNEY.

Witnesses:
R. L. Rosebrough,
G. G. Fairley.

Copies of this patent may be obtained for five cents each, by addressing the "Commissioner of Patents, Washington, D. C."